(12) United States Patent
Zhao et al.

(10) Patent No.: US 11,477,369 B2
(45) Date of Patent: Oct. 18, 2022

(54) CAMERA AND METHOD FOR FUSING SNAPPED IMAGES

(71) Applicant: HANGZHOU HIKVISION DIGITAL TECHNOLOGY CO., LTD., Hangzhou (CN)

(72) Inventors: Guohui Zhao, Hangzhou (CN); Zhuanqiang Li, Hangzhou (CN)

(73) Assignee: Hangzhou Hikvision Digital Technology Co., Ltd.

( * ) Notice: Subject to any disclaimer, the term of this patent is extended or adjusted under 35 U.S.C. 154(b) by 0 days.

(21) Appl. No.: 15/734,835

(22) PCT Filed: Sep. 12, 2018

(86) PCT No.: PCT/CN2018/105225
§ 371 (c)(1),
(2) Date: Dec. 3, 2020

(87) PCT Pub. No.: WO2019/232969
PCT Pub. Date: Dec. 12, 2019

(65) Prior Publication Data
US 2021/0235011 A1 Jul. 29, 2021

(30) Foreign Application Priority Data

Jun. 4, 2018 (CN) .......................... 201810563691.4

(51) Int. Cl.
*H04N 5/232* (2006.01)
*H04N 5/225* (2006.01)

(52) U.S. Cl.
CPC ....... *H04N 5/23229* (2013.01); *H04N 5/2258* (2013.01); *H04N 5/23227* (2018.08)

(58) Field of Classification Search
CPC .............. H04N 5/2254; H04N 5/2258; H04N 5/23227; H04N 5/23229; H04N 5/23245; H04N 5/2353; H04N 5/243; H04N 5/332
See application file for complete search history.

(56) References Cited

U.S. PATENT DOCUMENTS 5,438,360 A * 8/1995 Edwards ............ H04N 5/23248
348/143
6,781,127 B1 * 8/2004 Wolff ..................... G01J 3/0272
250/332

(Continued)

FOREIGN PATENT DOCUMENTS

CN    101893804       11/2010
CN    101893804 A *   11/2010
(Continued)

OTHER PUBLICATIONS

Extended European Search Report issued in Appln. No. 18921360.6, dated Apr. 19, 2021, 9 pages.

(Continued)

*Primary Examiner* — James T Boylan
(74) *Attorney, Agent, or Firm* — Fish & Richardson P.C.

(57) ABSTRACT

The present application provides cameras and snapped image fusing methods. The camera includes: a lens, a light splitter, a first image sensor, a second image sensor, and a master processing chip. The light splitter is configured to split incident light, which enters the camera through the lens, into visible light and infrared light. The first image sensor is configured to receive the visible light, and obtain a visible light video image by performing video image capture according to a first shutter and a first gain. The second image sensor is configured to receive the infrared light, and obtain an infrared light video image by performing video image capture according to the first shutter and the first gain. The (Continued)

master processing chip is configured to output a fused video image by fusing the visible light video image and the infrared light video image.

14 Claims, 4 Drawing Sheets

(56) References Cited

U.S. PATENT DOCUMENTS

| | | | | |
|---|---|---|---|---|
| 2011/0102616 | A1* | 5/2011 | Migiyama | G11B 27/3027 |
| | | | | 348/222.1 |
| 2012/0194689 | A1* | 8/2012 | Kodama | H04N 5/243 |
| | | | | 348/E5.045 |
| 2013/0235163 | A1 | 9/2013 | Hoon | |
| 2014/0168444 | A1 | 6/2014 | Jeong-Min et al. | |
| 2015/0288950 | A1* | 10/2015 | Zhang | H04N 13/239 |
| | | | | 348/47 |
| 2018/0309919 | A1* | 10/2018 | Naing | H04N 5/3765 |
| 2020/0036881 | A1* | 1/2020 | Asoma | H04N 13/25 |
| 2020/0329195 | A1* | 10/2020 | Soundrapandian | ................ |
| | | | | H04N 5/23227 |
| 2021/0224567 | A1* | 7/2021 | Wang | G06K 9/325 |

FOREIGN PATENT DOCUMENTS

| | | |
|---|---|---|
| CN | 103856764 | 6/2014 |
| CN | 203632765 | 6/2014 |
| CN | 104270570 | 1/2015 |
| CN | 204948210 | 1/2016 |
| CN | 205249392 | 5/2016 |
| CN | 105678727 | 6/2016 |
| CN | 105678727 A * | 6/2016 ........... G06T 3/0075 |
| CN | 106060364 | 10/2016 |
| CN | 106385530 | 2/2017 |
| EP | 2575355 | 4/2013 |
| JP | 2017011634 | 1/2017 |
| KR | 20150011098 | 1/2015 |
| WO | 2018049849 | 3/2018 |

OTHER PUBLICATIONS

PCT International Written Opinion in International Appln. No. PCT/CN2018/105225, dated Mar. 1, 2019, 9 pages (With English Translation).

Chinese Office Action issued in Chinese Application No. 201810563691.4 dated Apr. 10, 2020, 17 pages (With English Translation).

Chinese Office Action issued in Chinese Application No. 201810563691.4 dated Sep. 16, 2020, 19 pages (With English Translation).

PCT International Search Report in International Application No. PCT/CN2018/105,225, dated Mar. 1, 2019, 4 pages (With English Translation).

* cited by examiner

CAMERA AND METHOD FOR FUSING SNAPPED IMAGES

CROSS-REFERENCE TO RELATED APPLICATIONS

This present application is a U.S. national phase of PCT Application No. PCT/CN2018/105225, having an International Filing Date of Sep. 12, 2018, which claims priority to Chinese Patent Application No. 201810563691.4 entitled "CAMERA AND METHOD FOR FUSING SNAPPED IMAGES" and filed on Jun. 4, 2018. The disclosures of the prior applications are considered part of the disclosure of this application, and are incorporated herein by reference in their entireties into this application.

TECHNICAL FIELD

The present application relates to the field of video monitoring technology, and in particular, to cameras and methods for fusing snapped images.

BACKGROUND

An intelligent traffic camera mainly uses a single sensor to take a snapshot with infrared burst flashing or white light burst flashing. An image snapped by the infrared burst flashing is color cast or black-and-white. The white light burst flashing can capture a color image, but needs to be equipped with a white light strobe for light supplementation. The white light strobe may have severe light pollution. Moreover, white light burst flashing that appears suddenly on a road at night will cause temporary blindness of a driver, which may result in danger.

SUMMARY

In view of this, the present application provides cameras and snapped image fusing methods.

To be specific, the present application is implemented through the following technical solutions.

According to a first aspect of examples of the present application, there is provided a camera. The camera is applicable to a video monitoring system, and includes: a lens, a light splitter, a first image sensor, a second image sensor, and a master processing chip.

The light splitter is configured to split incident light, which enters the camera through the lens, into visible light and infrared light.

The first image sensor is configured to receive the visible light output by the light splitter, and obtain a visible light video image by performing visible light video image capture according to a first shutter and a first gain.

The second image sensor is configured to receive the infrared light output by the light splitter, and obtain an infrared light video image by performing infrared light video image capture according to the first shutter and the first gain.

The master processing chip is configured to output a fused video image by fusing the visible light video image and the infrared light video image, where fusion processing includes fusing brightness information of the visible light video image and brightness information of the infrared light video image, or fusing detail information of the visible light video image and detail information of the infrared light video image.

Optionally, the master processing chip is further configured to transmit, in response to receiving a snapshot instruction, the snapshot instruction to the first image sensor and the second image sensor, respectively;

the first image sensor is further configured to obtain, in response to receiving the snapshot instruction, a visible light image by taking a snapshot according to a second shutter and a second gain;

the second image sensor is further configured to obtain, in response to receiving the snapshot instruction, an infrared light image by taking a snapshot according to the second shutter and the second gain; and the master processing chip is further configured to output a fused snapped image by fusing the visible light image and the infrared light image.

Optionally, the first image sensor is further configured to, in response to receiving the snapshot instruction, interrupt the visible light video image capture; and the second image sensor is further configured to, in response to receiving the snapshot instruction, interrupt the infrared light video image capture.

Optionally, the camera further includes a synchronization processor configured to:

receive the snapshot instruction from the master processing chip; transmit the snapshot instruction to the first image sensor and the second image sensor respectively within a preset period of time;

receive the visible light image from the first image sensor and the infrared light image from the second image sensor in accordance with a preset timing; and transmit the visible light image and the infrared light image to the master processing chip. Optionally, the synchronization processor is further configured to splice a frame of the visible light image and a frame of the infrared light image snapped synchronously into a frame of spliced image, and transmit the spliced image to the master processing chip.

Optionally, the synchronization processor is further configured to splice a frame of the visible light image and a frame of the infrared light image snapped synchronously into a frame of spliced image, and transmit the spliced image to the master processing chip; and the master processing chip is further configured to split the spliced image into the frame of visible light image and the frame of infrared light image.

Optionally, the master processing chip is further configured to perform at least one of the following processing on the fused snapped image: image signal processing, ISP, encoding or compression.

Optionally, the camera further includes: a slave processing chip, where the master processing chip is further configured to transmit the visible light image and the infrared light image to the slave processing chip; and the slave processing chip is configured to obtain the fused snapped image by fusing the visible light image and the infrared light image, and transmit the fused snapped image to the master processing chip. Optionally, the slave processing chip is further configured to, before transmitting a fused image to the master processing chip, perform ISP on the fused image.

Optionally, the slave processing chip is further configured to perform at least one of the following processing on the fused snapped image: ISP, encoding or compression.

Optionally, the slave processing chip is further configured to perform vehicle feature recognition on the fused snapped image based on a deep learning algorithm; and transmit a recognition result to the master processing chip.

According to a second aspect of the examples of the present application, there is provided a snapped image fusing method. The method is applicable to a camera in a video monitoring system, and includes:

splitting, by a light splitter in the camera, incident light, which enters the camera through a lens in the camera, into visible light and infrared light;

receiving, by a first image sensor in the camera, the visible light output by the light splitter, and obtaining, by the first image sensor, a visible light video image by performing visible light video image capture according to a first shutter and a first gain;

receiving, by a second image sensor in the camera, the infrared light output by the light splitter, and obtaining, by the second image sensor, an infrared light video image by performing infrared light video image capture according to the first shutter and the first gain; and outputting, by a master processing chip in the camera, a fused video image by fusing the visible light video image and the infrared light video image, where fusion processing includes fusing brightness information of the visible light video image and brightness information of the infrared light video image, or fusing detail information of the visible light video image and detail information of the infrared light video image.

Optionally, transmitting, by the master processing chip in response to receiving a snapshot instruction, the snapshot instruction to the first image sensor and the second image sensor, respectively;

obtaining, by the first image sensor in response to receiving the snapshot instruction, a visible light image by taking a snapshot according to a second shutter and a second gain;

obtaining, by the second image sensor in response to receiving the snapshot instruction, an infrared light image by taking a snapshot according to the second shutter and the second gain; and outputting, by the master processing chip, a fused snapped image by fusing the visible light image and the infrared light image.

Optionally, interrupting, by the first image sensor in response to receiving the snapshot instruction, the visible light video image capture; and interrupting, by the second image sensor in response to receiving the snapshot instruction, the infrared light video image capture.

Optionally, transmitting the snapshot instruction to the first image sensor and the second image sensor respectively includes:

transmitting, by the master processing chip, the snapshot instruction to a synchronization processor in the camera; and transmitting, by the synchronization processor, the snapshot instruction to the first image sensor and the second image sensor respectively within a preset period of time.

Optionally, transmitting, by the first image sensor, the visible light image to the synchronization processor; transmitting, by the second image sensor, the infrared light image to the synchronization processor; and transmitting, by the synchronization processor, the visible light image and the infrared light image to the master processing chip.

Optionally, transmitting the visible light image and the infrared light image to the master processing chip includes:

splicing, by the synchronization processor, a frame of the visible light image and a frame of infrared light image snapped synchronously into a frame of spliced image; and transmitting, by the synchronization processor, the spliced image to the master processing chip.

Optionally, transmitting, by the master processing chip, the visible light image and the infrared light image to a slave processing chip in the camera;

obtaining, by the slave processing chip, the fused snapped image by fusing the visible light image and the infrared light image; and transmitting, by the slave processing chip, the fused snapped image to the master processing chip.

Optionally, performing, by the master processing chip, at least one of the following processing on the fused snapped image: ISP, encoding or compression.

Optionally, performing, by the slave processing chip, at least one of the following processing on the fused snapped image: ISP, encoding or compression.

Optionally, performing, by the slave processing chip, vehicle feature recognition on the fused snapped image based on a deep learning algorithm, and transmitting, by the slave processing chip, a recognition result to the master processing chip.

For the cameras in the examples of the present application, when the first image sensor and the second image sensor receive a snapshot signal or a synchronization command during capturing video images in accordance with the first shutter and the first gain, the first image sensor and the second image sensor can take the snapshots in accordance with the second shutter and the second gain, and transmit the snapped visible light image and infrared light image to the master processing chip, respectively, such that the master processing chip outputs a fused snapped image. That is, the cameras support taking a snapshot during the video image capture, and the snapshot may have an independent shutter and gain. The shutter and gain during the snapshot can be adjusted to ensure the clarity of detail information of license plates and vehicles when the image are snapped, to prevent over-exposure of vehicles and license plates, thereby ensuring that the snapshot can be performed with a relative short shutter when the vehicles drives quickly and ensuring that no vehicle tailing in the snapshot.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context.

To enable those skilled in the art to better understand the technical solutions provided in the examples of the present application, and make the above objectives, features and advantages of the examples of this application more apparent and understandable, the technical solutions in the examples of the present application will be further described in detail below in conjunction with the drawings.

Figure 1:
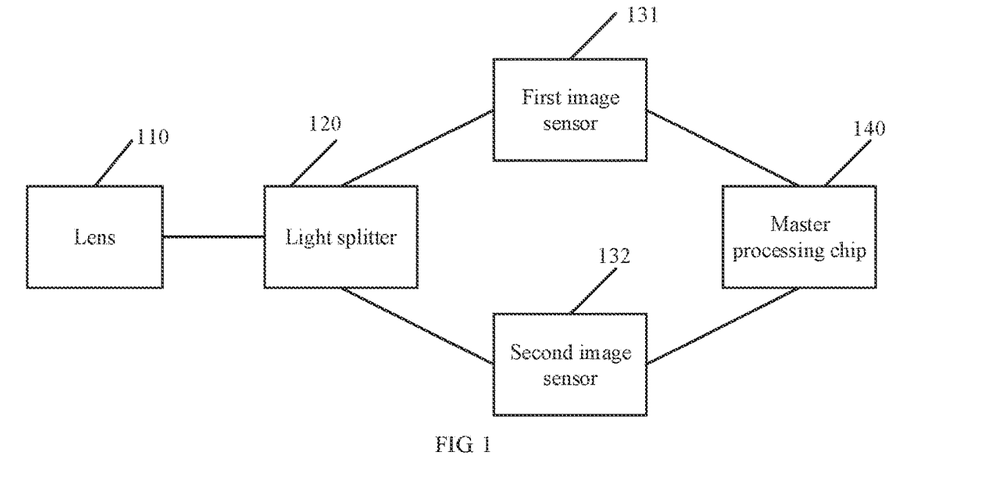
FIG. 1 is a schematic structural diagram illustrating a camera according to an example of the present application.

Please refer to FIG. 1, which is a schematic structural diagram illustrating a camera according to an example of the present application. As shown in FIG. 1, the camera may include: a lens 110, a light splitter 120, a first image sensor 131, a second image sensor 132 and a master processing chip (hereinafter referred to as a master chip) 140.

The light splitter 120 can be configured to split incident light, which enters the camera through the lens 110, into visible light and infrared light, and output the visible light and the infrared light to the first image sensor 131 and the second image sensor 132, respectively.

The first image sensor 131 can be configured to perform visible light video image capture according to a first shutter and a first gain, and transmit a captured visible light video image to the master chip 140.

The second image sensor 132 can be configured to perform infrared light video image capture according to the first shutter and the first gain, and transmit a captured infrared light video image to the master chip 140.

The master chip 140 can be configured to fuse the captured visible light video image and the captured infrared light video image, and output a fused video image.

In the example of the present application, by deploying the light splitter 120 in the camera, the incident light entering the camera through the lens is divided into the visible light and the infrared light. Further, by deploying two image sensors (herein referred to as the first image sensor 131 and the second image sensor 132) in the camera corresponding to a visible light output direction and an infrared light output direction of the light splitter 120 respectively, the first image sensor 131 collects the visible light video image from the visible light output by the light splitter 120 according to the first shutter and the first gain, and the second image sensor 132 collects the infrared light video image from the infrared light output by the light splitter 120 according to the first shutter and the first gain. Then, the master chip 140 can fuse the visible light video image collected by the first image sensor 131 and the infrared light video image collected by the second image sensor 132 to obtain a preview bit stream. The fusion processing performed by the master chip 140 may perform with different fusion algorithm strategies for different scenes. In some cases, brightness information of video images is fused. In some cases, detail information of video images is fused.

To further optimize a display effect of a video image and reduce a bandwidth required for video transmission, after the fusion of the visible light video image and the infrared light video image, the master chip 140 may perform Image Signal Processing (ISP), encoding, compression, or other processing, the specific implementation of which is not described in detail here.

The light splitter is deployed in the camera to divide the incident light into the visible light and the infrared light. The first image sensor corresponding to the visible light output direction of the light splitter is deployed to acquire the visible light video image. The second image sensor corresponding to the infrared light output direction of the light splitter is deployed to acquire the infrared light video image. And then the master chip fuses the visible light video image and the infrared light video image. Thus, not only the color but also the details and brightness of video images are ensured, and the display effect of the video image is optimized.

Further, in the examples of the present application, it is considered that the camera, when capturing the video image, usually uses a lower-speed shutter and a larger gain to ensure brightness of the image, while in some special scenes the camera may need to take a snapshot. Because a flashing lamp is generally used to supplement light during the snapshot, if using a larger gain, the snapped image may be over-exposed and have more noisy points, which may result in unclear image details. In addition, when a vehicle is captured, if the vehicle speed is fast, a lower-speed shutter may easily cause a vehicle tailing in the captured image. In this way, accuracy of vehicle feature recognition performed based on the video image is poor.

To improve the accuracy of vehicle feature recognition, the camera provided by the examples of the present application may take a snapshot based on an independent shutter and gain during the video image capture. That is, when the snapshot is required during the video image capture, the snapshot is performed using a shutter and gain that are independent of the shutter and gain of the video image capture.

Accordingly, in the examples of the present application, the master chip 140 may also be configured to, when receiving a snapshot instruction, transmit the snapshot instruction to the first image sensor 131 and the second image sensor 132, respectively, such that the first image sensor 131 and the second image sensor 132 take synchronous snapshots.

The first image sensor 131 may also be configured to, when receiving the snapshot instruction, take a snapshot according to a second shutter and a second gain, and transmit a snapped visible light image to the master chip 140.

The second image sensor 132 may also be configured to, when receiving the snapshot instruction, take a snapshot according to the second shutter and the second gain, and transmit a snapped infrared light image to the master chip 140.

The master chip 140 may also be configured to fuse the snapped visible light image and the snapped infrared light image, and output a fused snapped image.

In the examples of the present application, the snapshot instruction may instruct synchronization operation and snapshot operation. The snapshot instruction may be issued in the form of one instruction, or in the form of multiple instructions including a snapshot signal and a synchronization command. The synchronization command includes, but is not limited to, a flashing lamp synchronization command, and a shutter and gain synchronization command for the image sensors (the first image sensor 131 and the second image sensor 132). The snapshot instruction may be triggered by, for example, an algorithm or an external signal used to determine that a snapshot is needed. In an example, a target detection algorithm can be used to monitor detection and classification of one or more targets within a scene, to correctly recognize the one or more targets such as a motor vehicle, a non-motor vehicle or a pedestrian, and meanwhile the one or more targets are tracked by a tracking algorithm. When detecting a target reaches a preset trigger line position, a signal to trigger the snapshot is given to corresponding sensors or another module through an interface to take a corresponding snapshot. In another example, an external device, such as a vehicle detector, a radar, etc., may check that a target e.g., a vehicle has passed, and notify the camera according to a set communication protocol. The camera, after analyzing the communication protocol, notifies corresponding sensors or another module through an interface to take a corresponding snapshot.

The master chip 140, when receiving a snapshot instruction, transmits the snapshot instruction to the first image sensor 131 and the second image sensor 132, respectively, to control the first image sensor 131 and the second image sensor 132 for synchronous snapshot.

When receiving the snapshot instruction, the first image sensor 131 and the second image sensor 132 can snap images (the visible light image and the infrared light image) synchronously in accordance with the second shutter and the second gain, and transmit snapped visible light image and infrared light image, respectively, to the master chip 140, which performs fusion processing.

When receiving the snapped visible light image and infrared light image, the master chip 140 can fuse the received visible light image and infrared light image, and perform ISP, encoding, compression, or other processing on the fused image.

In an example, the second shutter is smaller than the first shutter, and the second gain is smaller than the first gain.

In an example, the first image sensor 131 may be further configured to, when receiving the snapshot instruction, interrupt the video image capture, take the snapshot according to the second shutter and the second gain, and transmit the snapped visible light image to the master chip 140; and the second image sensor 132 may be further configured to, when receiving the snapshot instruction, interrupt the video image capture, take the snapshot according to the second shutter and the second gain, and transmit the snapped infrared light image to the master chip 140.

In this example, when receiving the snapshot instruction during a process of capturing video images, the first image sensor 131 and the second image sensor 132 may interrupt the video image capture and take the snapshot, such that all resources of the image sensors (the first image sensor 131 and the second image sensor 132) may be used for the video image capture or snapshot. Thus, quality of video images or snapped images can be improved. In this example, the image sensors collect data of each frame of the video images, and when receiving the snapshot instruction, immediately interrupt the video image collection and take the snapshot. After the snapshot are completed, the video image collection will be resumed. All resources of the image sensors may include sensor storage, shutters and gains, synchronization control of a light supplementing lamp, etc., and all resources of the image sensors will be used for the snapshots after the snapshot instruction is received.

In this example, after completing the snapshot, the first image sensor 131 and the second image sensor 132 can continue the video image capture. For specific implementations, reference may be made to the relevant description in the above method examples, which will not be repeated here.

In another example, the first image sensor 131 may be further configured to, when receiving a snapshot instruction, perform video image capture according to the first shutter and the first gain, take a snapshot according to the second shutter and the second gain, and transmit a visible light video image and a visible light image to the master chip 140 respectively.

The second image sensor 132 may be further configured to, when receiving a snapshot instruction, perform video image capture according to the first shutter and the first gain, take a snapshot according to the second shutter and the second gain, and transmit an infrared light video image and an infrared light image to the master chip 140 respectively.

In this example, the image sensors (including the first image sensor 131 and the second image sensor 132) may perform the video image capture and the snapshot at the same time, thereby avoiding the interruption of the video image capture. That is, the image sensors may use a part of resources for the video image capture and another part of resources for the snapshot (when the snapshot is not required, this part of resources is idle, that is, the image sensors reserve a part of resources for the snapshot), thereby ensuring that the video image capture and the snapshot are carried out independently of each other. In the example, frames obtained by the image sensors may be divided to odd-even (10101010 . . . ) frames. The odd-even frames alternately collect data using two different sets of shutters and gains, respectively. For example, data captured in odd-numbered frames is transmitted to the master chip 140 as a video image. When the snapshot instruction is received, one of even-numbered frames of image is transmitted to the master chip 140 as a snapped image.

It should be noted that in another example of the present application, the first image sensor 131 and the second image sensor 132 may implement the snapshot by directly copying a captured video image when receiving the snapshot instruction. That is, a specific frame within the video images captured during receiving the snapshot instruction is directly copied as the snapped image. The snapped image is transmitted to the master chip 140. The master chip 140 performs subsequent processing in the above-mentioned manner, and specific implementations thereof will not be described here.

In addition, for the fusion of the visible light video image and the infrared light video image, and for the fusion of the visible light snapshot and the infrared light snapshot, reference may be made to the relevant description in the related solutions, which will not be described in the examples of the present application.

It can be seen that in the camera shown in FIG. 1, the camera supports taking the snapshot during the video image collection. The snapshot has an independent (relative to the video image collection) shutter and gain, and the shutter and gain during the snapshot can be adjusted to ensure the clarity of detail information of license plates and vehicles when the image are snapped, to prevent over-exposure of vehicles and license plates, thereby ensuring that the snapshot can be performed with a relative short shutter when the vehicles drives quickly and ensuring that no vehicle tailing in the snapshot.

Figure 2:
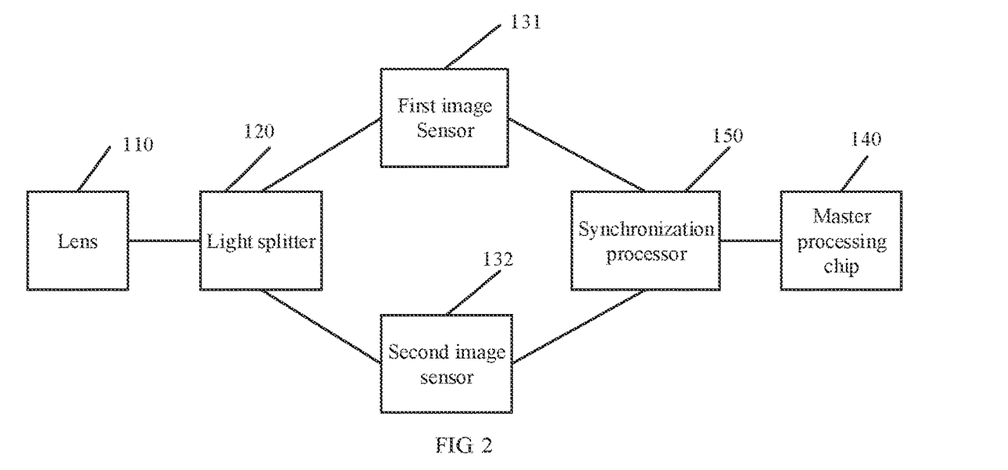
FIG. 2 is a schematic structural diagram illustrating a camera according to another example of the present application.

Further, as shown in FIG. 2, in an example of the present application, the camera may also include: a synchronization processor 150.

The synchronization processor 150 can be configured to receive a snapshot instruction transmitted by the master processing chip 140, and transmit the snapshot instruction to the first image sensor 131 and the second image sensor 132, respectively.

The synchronization processor 150 may also be configured to receive a visible light image snapped by the first image sensor 131 and an infrared light image snapped by the second image sensor 132, and transmit the visible light image and the infrared light image to the master chip 140 synchronously.

In this example, to ensure timing requirements during the snapshot, the synchronization processor 150 may be deployed in the camera. The synchronization processor 150 may be deployed between the image sensors (including the first image sensor 131 and the second image sensor 132) and the master chip 140.

The synchronization processor 150 may include, but is not limited to, a Field Programmable Gate Array (FPGA) chip or other chip that supports two paths of sensor data reception.

In the example, when receiving a snapshot instruction, the master chip 140 can transmit the snapshot instruction to the synchronization processor 150, and the synchronization processor 150 transmits the snapshot instruction to the first image sensor 131 and the second image sensor 132, respectively. After receiving the snapshot instruction, the synchronization processor 150 can transmit the snapshot instruction to the first image sensor 131 and the second image sensor 132 within a preset period of time, and control the light supplementing lamp to light up within a preset exposure time while the sensors are taking the snapshot, thereby synchronizing the exposure of the snapped image and flashing brightness of the light supplementing lamp. In addition, the synchronization processor 150 is also responsible for receiving data from the two sensors in accordance with a preset timing to ensure that the data from the sensors is snapped images.

After completing the snapshot, the first image sensor 131 and the second image sensor 132 can transmit the snapped images to the synchronization processor 150.

When the synchronization processor 150 receives the snapped images (including a visible light image and an infrared light image) from the first image sensor 131 and the second image sensor 132, the synchronization processor 150 can transmit the visible light image and the infrared light image to the master chip 140. The master chip 140 outputs a fused snapped image.

In an example, when transmitting the visible light image and the infrared light image to the master chip 140, the synchronization processor 150 may splice the visible light image and the infrared light image. The synchronization processor 150 splices a frame of the visible light image and a frame of the infrared light image together into a frame of image, and transmits the spliced image to the master chip 140. Since a data header is to be added for each data transmission, the splicing processing here may reduce redundant transmission of the data header, and reduce the number of interruptions in a data transmission mechanism, thereby improving efficiency of transmitting the snapped images to the master chip 140.

When receiving the spliced image from the synchronization processor 150, the master chip 140 can split the spliced image into two separate frames of snapped image (the visible light image and the infrared light image). The master chip 140 can fuse the two frames of snapped image, extract color information from the visible light image, extract detail and brightness information from the infrared light image, and fuse the visible light image and the infrared light image into one frame of color image.

In another example, when a bandwidth between the synchronization processor 150 and the master chip 140 is small, the synchronization processor 150 may transmit the visible light image and the infrared light image to the master chip 140, respectively, and then the master chip 140 performs fusion processing.

In another example, to reduce a workload of the master chip, the synchronization processor 150 may also perform fusion processing on video images transmitted by the first image sensor 131 and the second image sensor 132.

Figure 3:
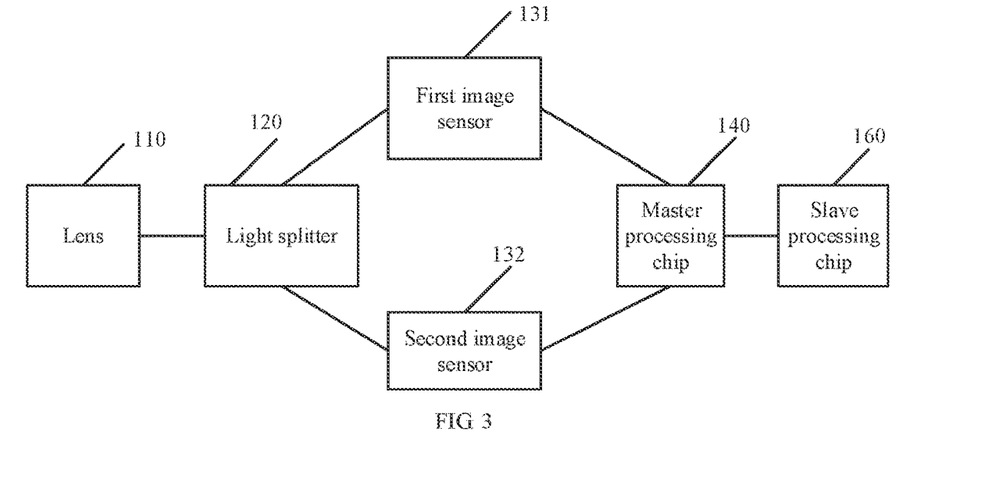
FIG. 3 is a schematic structural diagram illustrating a camera according to another example of the present application.

Further, referring to FIG. 3, in an example of the present application, the camera may further include a slave processing chip (hereinafter referred to as a slave chip) 160.

The master chip 140 may be configured to transmit a visible light image and an infrared light image to the slave chip 160;

the slave chip 160 may be configured to fuse the visible light image and the infrared light image, and transmit the fused image to the master chip 140; and the master chip 140 may be further configured to perform ISP, encoding, or compression on the fused image, and output the processed image.

In the example, to reduce a workload of the master chip 140 and simplify the implementation of the master chip 140, the slave chip 160 may be deployed in the camera. The slave chip 160 may connect to and interact data with the master chip 140.

In the example, when the master chip 140 receives the visible light image and the infrared light image, the master chip 140 may transmit the visible light image and the infrared light image to the slave chip 160.

When the slave chip 160 receives the visible light image and the infrared light image, the slave chip 160 may perform fusion processing on the visible light image and the infrared light image, and transmit the fused image to the master chip 140. The master chip 140 performs ISP, encoding, or compression such as JPEG (Joint Photographic Experts Group) compression processing on the fused image.

In an example, to further optimize the image display effect and reduce the workload of the master chip 140, before the slave chip 160 transmits the fused image to the master chip 140, the slave chip 160 may perform ISP on the fused image, and transmit the processed image to the master chip 140. The master chip 140 may perform secondary ISP, encoding, compression or other processing on the received image when receiving the image from the slave chip 160.

In another example, to further reduce the workload of the master chip 140, before the slave chip 160 transmits the fused image to the master chip 140, the slave chip 160 may perform ISP on the fused image, and perform encoding, compression, or other processing on the fused image. Then the processed image is transmitted to the master chip 140. When receiving the image from the slave chip 160, the master chip 140 may no longer perform processing thereon. Both the master chip 140 and the slave chip 160 are capable of ISP, encoding, compression and other processing for the image, and allocation of processing tasks can be adjusted in real time considering the load balancing of the chips in the camera.

It should be noted that in this example, the visible light image and the infrared light image transmitted from the master chip 140 to the slave chip 160 may be two separate frames of snapped image, or a spliced image, which is spliced by the master chip 140 or the synchronization processor 150 (if the camera deploys the synchronization processor 150). When the image received by the slave chip 160 is the spliced image, the spliced image may be split into two separate frames of image, and then fusion processing is performed thereon.

Further, in the examples of the present application, after obtaining the fused snapped image, the camera may perform vehicle feature recognition on the fused snapped image to obtain one or more of vehicle feature information, such as a vehicle body color, a vehicle model, a face recognition result for a vehicle window, a vehicle master brand and sub-brand, and so on.

Accordingly, in an example of the present application, when the camera also equips with the slave chip 160, the slave chip 160 may be configured to perform vehicle feature recognition on the fused image based on a deep learning algorithm, and transmit a recognition result to the master chip.

In the example, the deep learning algorithm may be integrated in the slave chip 160. After the slave chip 160 completing the image fusion for the visible light image and the infrared light image transmitted by the master chip 140, the slave chip 160 may perform vehicle feature recognition on the fused image based on the deep learning algorithm, and transmit, to the master chip 140, the recognition result, e.g., one or more of vehicle feature information such as a vehicle body color, a vehicle model, a face recognition result for a vehicle window, a vehicle master brand and sub-brand, and so on. The master chip 140 may perform corresponding processing according to the received recognition result.

To make those skilled in the art better understand the technical solutions provided by the examples of the present application, taking interrupting to have a snapshot as an example, the working principle of the camera provided by the examples of the present application is briefly described below in conjunction with specific examples.

Figure 4:
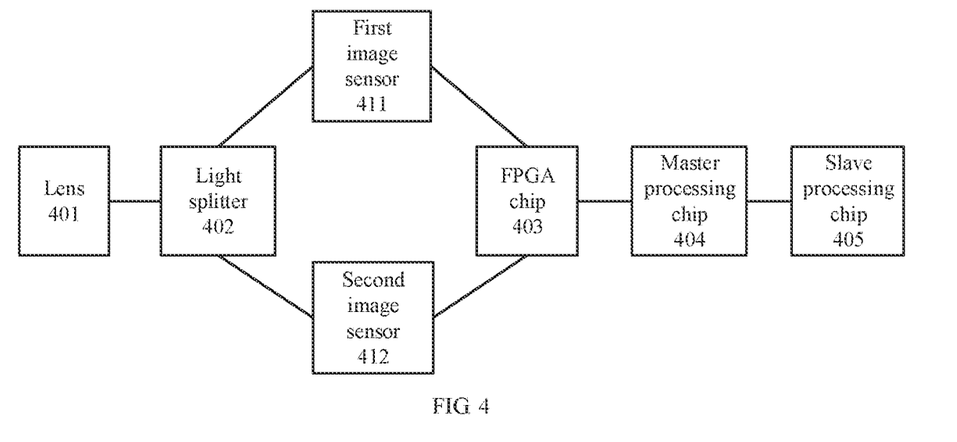
FIG. 4 is a schematic structural diagram illustrating a camera according to an example of the present application.

Please refer to FIG. 4, which is a schematic structural diagram illustrating a camera according to an example of the present application. As shown in FIG. 4, in this example, the camera includes a lens 401, a light splitter 402, a first image sensor 411, a second image sensor 412 (the image sensors in this example use global exposure image sensors, for example, global exposure Complementary Metal-Oxide-Semiconductor (CMOS) image sensors), an FPGA chip (in this example, a synchronization processor being the FPGA chip is taken as an example) 403, a master chip 404 and a slave chip 405 (integrated with a Graphics Processing Unit (GPU) and a deep learning algorithm).

In this example, incident light, which enters the camera through the lens 401 in the camera, is divided into visible light and infrared light by the light splitter.

The light splitter 402 may be implemented by a prism. The visible light portion in the incident light, after entering the prism, is transmitted out. The infrared light portion in the incident light, after entering the prism, is emitted after one reflection.

In the example, the first image sensor 411 and the second image sensor 412 are each deployed at an outgoing position of two light sources of the light splitter 402. The first image sensor 411 is deployed at an outgoing position of a visible light source of the light splitter 402. The second image sensor 412 is deployed at an outgoing position of an infrared light source of the light splitter 402.

The first image sensor 411 and the second image sensor 412 may capture a visible light video image and an infrared light video image according to a first shutter and a first gain, respectively, and integrate the visible light video image and the infrared light video image into the FPGA chip 403. The FPGA chip 403 fuses the visible light video image and the infrared light video image, and outputs the fused video image to the master chip 404. The master chip 404 performs ISP, algorithm analysis, encoding, compression or other processing on the fused video image, and outputs a preview bit stream.

The master chip 404, after obtaining the fused video image, may transmit the fused video image to the slave chip 405. The slave chip 405 performs target analysis on the fused video image based on the deep learning algorithm, for example, performs one or more processing such as target detection, target tracking, target classification, and so on.

In the example, when receiving a snapshot instruction, the master chip 404 transmits the snapshot instruction to the FPGA chip 403. The FPGA chip 403 transmits the snapshot instruction to the first image sensor 411 and the second image sensor 412, respectively.

The snapshot instruction received by the master chip 404 may be triggered by, for example, an algorithm or an external signal used to determine that a snapshot is needed.

In the example, upon receiving the snapshot instruction, the first image sensor 411 and the second image sensor 412 may interrupt the video image capture, and take a snapshot according to a second shutter and a second gain. The first image sensor 411 takes a visible light snapshot. The second image sensor 412 takes an infrared light snapshot.

The first image sensor 411 and the second image sensor 412 transmit the snapped visible light image and infrared light image to the FPGA chip 403, respectively. The FPGA chip 403 splices the visible light image and the infrared light image (a frame of the visible light image and a frame of the infrared light image are spliced into a frame of spliced image), and outputs the spliced image to the master chip 404.

Upon receiving the spliced image from the FPGA chip 403, the master chip 404 splits the spliced image into two separate frames of snapped image (the visible light image and the infrared light image), and transmits the two frames of snapped image to the slave chip 405.

When receiving the visible light image and the infrared light image from the master chip 404, the slave chip 405 performs pixel-level fusion on the visible light image and the infrared light image. The slave chip 405 extracts color information from the visible light image and detail and brightness information from the infrared light image, fuses the visible light image and the infrared light image into one frame of color image, and performs ISP on the frame of color image. Then, on the one hand, the slave chip 405 transmits the processed image to the master chip 404. And on the other hand, the slave chip 405 performs vehicle feature recognition on the processed image to obtain a recognition result, and transmits the recognition result to the master chip 404, where the recognition result may include one or more results, such as a vehicle model, a vehicle body color, a vehicle brand (including a master brand and a sub-brand), a face at a vehicle window, whether there is a phoning behavior, whether a safety belt is worn, etc.

The master chip 404 and the slave chip 405 can interact with each other via a Universal Serial Bus (USB) communication, a Peripheral Component Interconnect Express (PCIE) communication, or a network communication.

It can be seen that in the example, the camera can support interrupting (video image collection) to take a snapshot technology. The camera may use different shutters and gains for video image capture and snapshot. For the video image capture, the shutter and the gain may be enlarged to ensure the brightness of a preview image. For the snapshot, the shutter and the gain (less than that for the video image capture) may be adjusted according to a principle of ensuring the clarity of license plates and vehicle details, such as a vehicle model, brands, etc., so as to prevent over-exposure of vehicles and license plates, thereby ensuring that the snapshot can be performed with a relative short shutter when the vehicles drives quickly and ensuring that no vehicle tailing in the snapshot.

Figure 5:
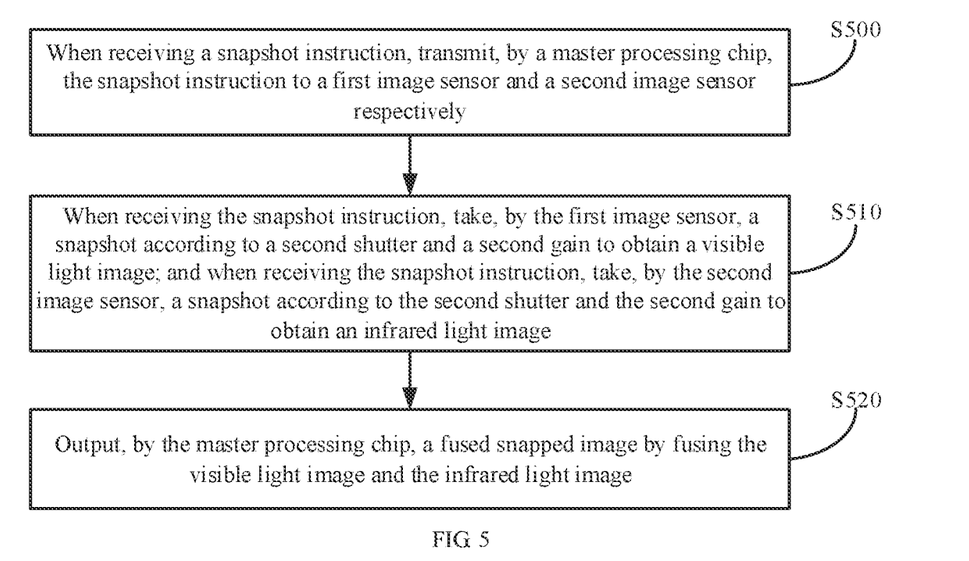
FIG. 5 is a schematic flowchart illustrating a snapped image fusing method according to an example of the present application.

Please refer to FIG. 5, which is a schematic flowchart illustrating a snapped image fusing method according to an example of the present application. The snapped image fusing method may be applicable to the camera shown in any of FIGS. 1 to 3. As shown in FIG. 5, the snapped image fusing method may include the following steps.

At step S500, when receiving a snapshot instruction, a master processing chip transmits the snapshot instruction to a first image sensor and a second image sensor, respectively.

In the example of the present application, the snapshot instruction may include multiple instructions such as a snapshot signal and a synchronization command. The snapshot instruction can be triggered by an algorithm or an external signal. When the master chip receives the snapshot instruction, the master chip may transmit the snapshot instruction to the first image sensor and the second image sensor, respectively, so as to interrupt for a snapshot, that is, interrupt video image collection to take the snapshot.

At step S510, when receiving the snapshot instruction, the first image sensor obtains a visible light image by taking a snapshot according to a second shutter and a second gain; and when receiving the snapshot instruction, the second image sensor obtains an infrared light image by taking a snapshot according to the second shutter and the second gain.

In the example of the present application, when receiving the snapshot instruction, the first image sensor and the second image sensor may take synchronous snapshots (the visible light image and the infrared light image) according to the second shutter and the second gain, and transmit the visible light image and the infrared light image to the master chip, respectively. The master chip performs fusion processing.

At step S520, the master processing chip outputs a snapped image after fusion of the visible light image and the infrared light image.

In the example of the present application, the master chip, when receiving the snapped visible light image and infrared light image, may fuse the received visible light image and infrared light image, and perform ISP, encoding, compression or other processing on the fused image.

In an example of the present application, taking the snapshot and transmitting the snapped visible light image to the master processing chip by the first image sensor, and taking the snapshot and transmitting the snapped infrared light image to the master processing chip by the second image sensor may include that:

the first image sensor interrupts visible light video image capture, takes a snapshot according to the second shutter and the second gain, and transmits the snapped visible light image to the master processing chip; and the second image sensor interrupts infrared light video image collection, takes a snapshot according to the second shutter and the second gain, and transmits the snapped infrared light image to the master processing chip.

In this example, when receiving the snapshot instruction during a process of capturing video images, the first image sensor and the second image sensor may interrupt the video image capture and take the snapshot. Thus, all resources of the image sensors can be used for the video image capture or snapshot, thereby improving quality of video images or snapped images.

In another example of the present application, taking the snapshot and transmitting the snapped visible light image to the master processing chip by the first image sensor, and taking the snapshot and transmitting the snapped infrared light image to the master processing chip by the second image sensor may include that:

the first image sensor captures a visible light video image according to a first shutter and a first gain, takes a snapshot according to a second shutter and a second gain, and transmits the visible light video image and a visible light image to the master processing chip, respectively; the second image sensor captures an infrared light video image according to the first shutter and the first gain, takes a snapshot according to the second shutter and the second gain, and transmits the infrared light video image and an infrared light image to the master processing chip, respectively.

In this example, the image sensors (including the first image sensor and the second image sensor) may perform the video image capture and the snapshot at the same time, thereby avoiding the interruption of the video image capture. That is, the image sensors may use a part of resources for the video image capture and another part of resources for the snapshot (when the snapshot is not required, this part of resources is idle, that is, the image sensors reserve a part of resources for the snapshot), thereby ensuring that the video image capture and the snapshot are carried out independently of each other.

Further, in an example of the present application, the camera may include: a synchronization processor.

Figure 6:
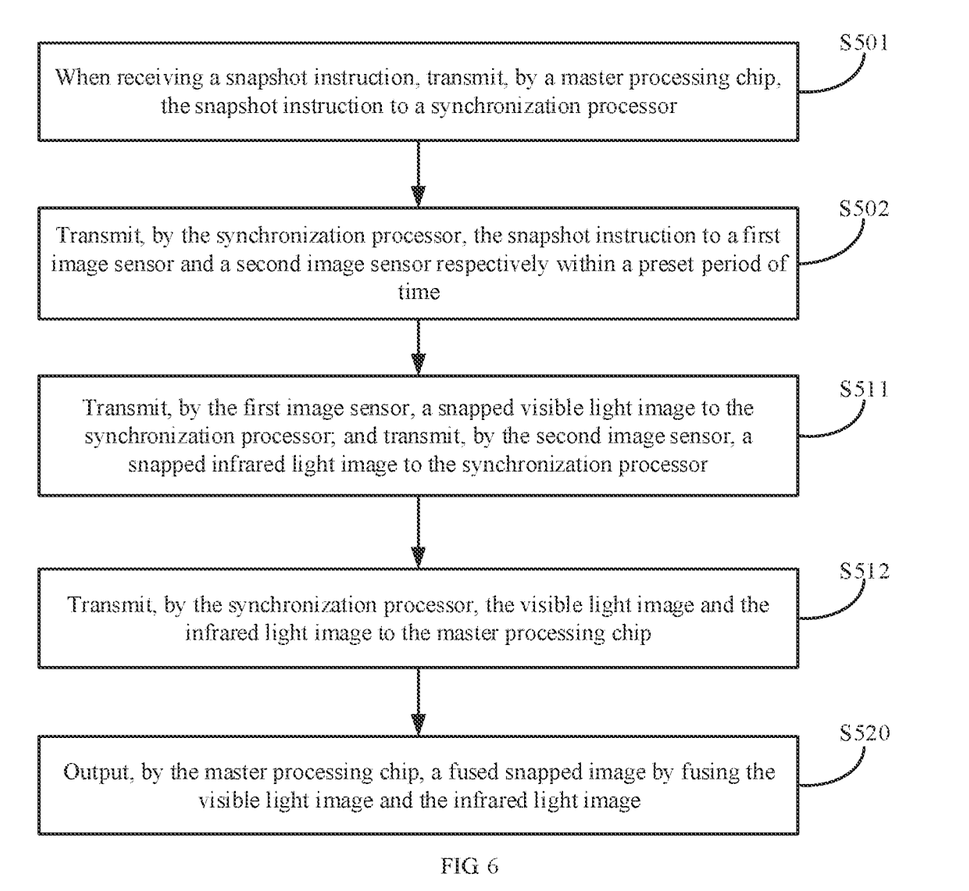
FIG. 6 is a schematic flowchart illustrating a snapped image fusing method according to another example of the present application.

Accordingly, referring to FIG. 6, at step S500, transmitting the snapshot instruction to the first image sensor and the second image sensor respectively may include the following steps:

at step S501, the master processing chip transmits the snapshot instruction to the synchronization processor; and at step S502, the synchronization processor transmits the snapshot instruction to the first image sensor and the second image sensor respectively within a preset period of time.

Transmitting, by the first image sensor, the snapped visible light image to the master processing chip, and transmitting, by the second image sensor, the snapped infrared light image to the master processing chip may include the following steps:

at step S511, the first image sensor transmits the snapped visible light image to the synchronization processor, and the second image sensor transmits the snapped infrared light image to the synchronization processor; and at step S512, the synchronization processor transmits the visible light image and the infrared light image to the master processing chip.

In this example, to reduce the workload of the master chip and simplify the implementation of the master chip, a synchronization processor may be deployed in the camera. The synchronization processor may be deployed between the image sensors (including the first image sensor and the second image sensor) and the master chip.

In this example, when receiving a snapshot instruction, the master chip may transmit the snapshot instruction to the synchronization processor, and the synchronization processor transmits the snapshot instruction to the first image sensor and the second image sensor, respectively.

The first image sensor and the second image sensor, after completing the snapshots, may transmit the snapped images to the synchronization processor.

The synchronization processor, when receiving the snapped images (including a visible light image and an infrared light image) from the first image sensor and the second image sensor, may transmit the visible light image and the infrared light image to the master chip. The master chip outputs a fused snapped image.

In an example, the synchronization processor may splice the visible light image and the infrared light image. The synchronization processor splices a frame of the visible light image and a frame of the infrared light image into a frame of image, and transmits the spliced image to the master chip, thereby improving efficiency of transmitting the snapped images to the master chip.

When receiving the spliced image from the synchronization processor, the master chip may split the spliced image into two separate frames of snapped image (the visible light image and the infrared light image). The master chip can fuse the two frames of snapped image, extract color information from the visible light image, extract detail and brightness information from the infrared light image, and fuse the visible light image and the infrared light image into one frame of color image.

Further, in an example of the present application, the camera may further include: a slave processing chip.

Figure 7:
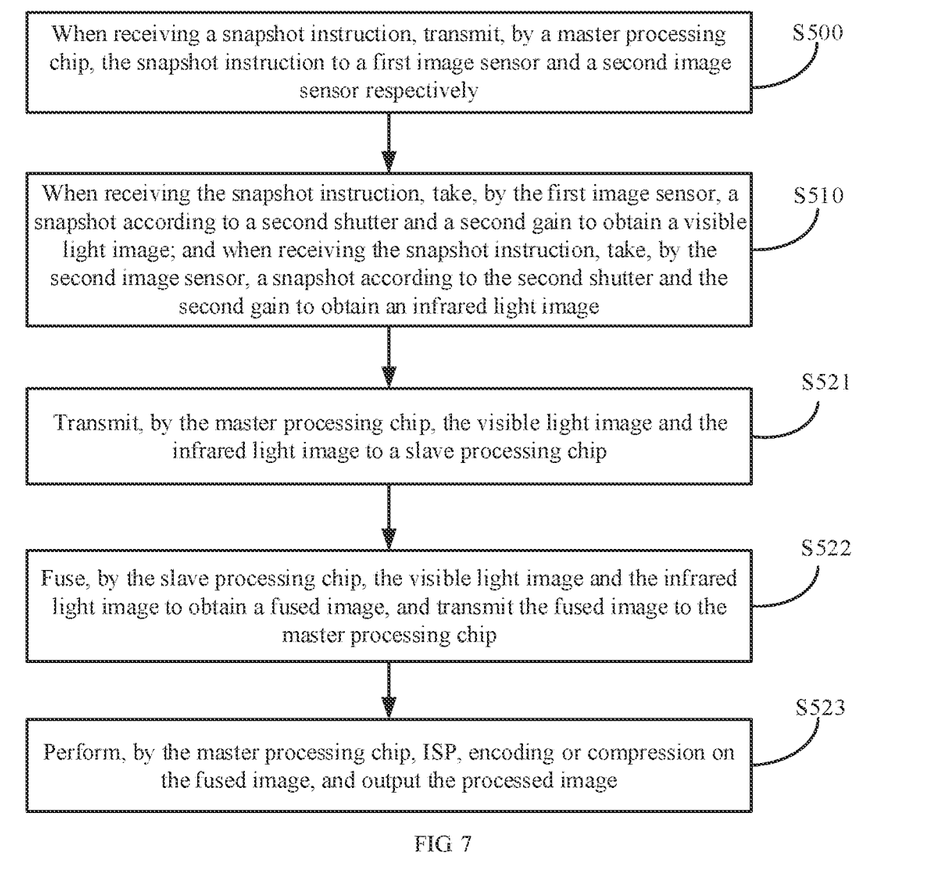
FIG. 7 is a schematic flowchart illustrating a snapped image fusing method according to another example of the present application.

Accordingly, referring to FIG. 7, in step S520, outputting, by the master processing chip, the fused snapped image may include the following steps:
- at step S521, the master processing chip transmits the visible light image and the infrared light image to the slave processing chip;
- at step S522, the slave processing chip obtains a fused image by fusing the visible light image and the infrared light image, and transmits the fused image to the master processing chip; and
- at step S523, the master processing chip performs ISP, encoding or compression on the fused image, and outputs the processed image.

In this example, to reduce the workload of the master chip and simplify the implementation of the master chip, a slave chip may be deployed in the camera. The slave chip may connect to and interact data with the master chip.

In the example, when receiving the snapped visible light image and infrared light image, the master chip can transmit the visible light image and the infrared light image to the slave chip.

When the slave chip receives the visible light image and the infrared light image, the slave chip may fuse the visible light image and the infrared light image, and transmit the fused image to the master chip. The master chip performs ISP, encoding, compression such as JPEG compression, or other processing on the fused image.

In an example, to further optimize the image display effect, before the slave chip transmits the fused image to the master chip, the slave chip may perform ISP on the fused image, and transmit the processed image to the master chip. The master chip may perform secondary ISP, encoding, compression or other processing on the received image when receiving the image from the slave chip.

In another example, to further reduce the workload of the master chip, before the slave chip transmits the fused image to the master chip, the slave chip may perform ISP on the fused image, and perform encoding, compression, or other processing on the fused image. Then the processed image is transmitted to the master chip. When receiving the image from the slave chip, the master chip may no longer perform processing thereon. Both the master chip and the slave chip are capable of ISP, encoding, compression and other processing for the image, and allocation of processing tasks can be adjusted in real time considering the load balancing of the chips in the camera.

Further, in this example of the present application, after obtaining the fused snapped images, the camera may perform vehicle feature recognition on the fused snapped image to obtain one or more of vehicle feature information, such as a vehicle body color, a vehicle model, a face recognition result for a vehicle window, a vehicle master brand and sub-brand, and so on.

Accordingly, in an example of the present application, when the camera also equips with the slave chip, the slave chip may be configured to perform vehicle feature recognition on the fused image based on a deep learning algorithm, and transmit a recognition result to the master processing chip.

In this example, the deep learning algorithm may be integrated in the slave chip. After the slave chip completes the image fusion for the visible light image and the infrared light image transmitted by the master chip, the slave chip may perform vehicle feature recognition on the fused image based on the deep learning algorithm, and transmit, to the master chip, a recognition result, e.g., one or more of vehicle feature information such as a vehicle body color, a vehicle model, a face recognition result for a vehicle window, a vehicle master brand and sub-brand, and so on. The master chip performs corresponding processing according to the received recognition result.

In the example of the present application, when the first image sensor and the second image sensor receive the snapshot instruction during capturing video images in accordance with the first shutter and the first gain, the first image sensor and the second image sensor can take the snapshots in accordance with the second shutter and the second gain, and transmit the snapped visible light image and infrared light image to the master processing chip, respectively. The master processing chip outputs a fused snapped image. That is, the camera supports taking a snapshot during the video image capture, and the snapshot may have an independent shutter and gain. The shutter and gain during the snapshot can be adjusted to ensure the clarity of detail information of license plates and vehicles when the image are snapped, to prevent over-exposure of vehicles and license plates, thereby ensuring that the snapshot can be performed with a relative short shutter when the vehicles drives quickly and ensuring that no vehicle tailing in the snapshot.

It should be noted that, in this context, relational terms such as "first" and "second" are used merely to distinguish one entity or operation from the other entity or operation, and do not necessarily require or imply the existence of any such actual relationship or order between these entities or operations. The terms "comprising", "including" or any other variants thereof are intended to cover non-exclusive inclusion, such that a process, method, article, or device including a series of elements includes not only those elements but also other elements not specifically listed, or further includes elements inherent to such process, method, article, or device. Under the circumstance of no more limitation, an element limited by the phrase "comprising a . . . " does not exclude the presence of additional equivalent elements in the process, method, article, or device that includes the element.

The above are only preferred examples of this application, and are not intended to limit the application. Any modification, equivalent replacement, improvement, etc. made within the spirit and principle of the present application shall be included within the protection scope of the application.

The invention claimed is:

1. A camera, comprising:
a lens;
a light splitter configured to split incident light into visible light and infrared light, wherein the incident light enters the camera through the lens;
a first image sensor configured to:
  receive the visible light output by the light splitter, and
  obtain a visible light video image by performing visible light video image capture according to a first shutter and a first gain;
a second image sensor configured to:
  receive the infrared light output by the light splitter, and
  obtain an infrared light video image by performing infrared light video image capture according to the first shutter and the first gain; and
a master processing chip configured to:
  output a fused video image by fusing the visible light video image and the infrared light video image, wherein fusing the visible light video image and the infrared light video image comprises at least one of
    fusing brightness information of the visible light video image and brightness information of the infrared light video image, or
    fusing detail information of the visible light video image and detail information of the infrared light video image;
a synchronization processor coupled to the master processing chip, the first image sensor, and the second image sensor; and
a slave processing chip coupled to the master processing chip,
wherein:
  the master processing chip is further configured to transmit, in response to receiving a snapshot instruction, the snapshot instruction to the synchronization processor,
  the synchronization processor is configured to:
    receive the snapshot instruction from the master processing chip, and
    transmit the snapshot instruction to the first image sensor and the second image sensor respectively within a preset period of time,
  the first image sensor is further configured to obtain, in response to receiving the snapshot instruction, a visible light image by taking a snapshot according to a second shutter and a second gain, wherein the second shutter and the second gain are determined independently of the first shutter and the first gain, wherein the second shutter is smaller than the first shutter, and the second gain is smaller than the first gain,
  the second image sensor is further configured to obtain, in response to receiving the snapshot instruction, an infrared light image by taking a snapshot according to the second shutter and the second gain,
  the synchronization processor is further configured to:
    receive the visible light image from the first image sensor and the infrared light image from the second image sensor in accordance with a preset timing, and
    transmit the visible light image and the infrared light image to the master processing chip,
  the master processing chip is further configured to perform at least one of:
    obtaining a fused snapped image by fusing the visible light image and the infrared light image, or
    transmitting the visible light image and the infrared light image to the slave processing chip,
  the slave processing chip is further configured to perform: obtaining the fused snapped image by fusing the visible light image and the infrared light image and transmitting the fused snapped image to the master processing chip, and performing vehicle feature recognition on the fused snapped image based on a deep learning algorithm and transmitting a recognition result to the master processing chip, and
  the master processing chip is further configured to output the fused snapped image.

2. The camera according to claim 1, wherein,
the first image sensor is further configured to, in response to receiving the snapshot instruction, interrupt the visible light video image capture; and
the second image sensor is further configured to, in response to receiving the snapshot instruction, interrupt the infrared light video image capture.

3. The camera according to claim 1, wherein,
the synchronization processor is further configured to splice a frame of the visible light image and a frame of the infrared light image snapped synchronously into a frame of spliced image, and transmit the spliced image to the master processing chip; and
the master processing chip is further configured to split the spliced image into the frame of the visible light image and the frame of the infrared light image.

4. The camera according to claim 1, wherein the master processing chip is further configured to perform at least one of the following processing on the fused snapped image:
image signal processing (ISP)
or
compression.

5. The camera according to claim 1, wherein the slave processing chip is further configured to perform at least one of the following processing on the fused snapped image:
ISP
or
compression.

6. A snapped image fusing method, being applicable to a camera in a video monitoring system, comprising:
splitting, by a light splitter in the camera, incident light into visible light and infrared light, wherein the incident light enters the camera through a lens in the camera;
receiving, by a first image sensor in the camera, the visible light output by the light splitter, and obtaining, by the first image sensor, a visible light video image by performing visible light video image capture according to a first shutter and a first gain;
receiving, by a second image sensor in the camera, the infrared light output by the light splitter, and obtaining, by the second image sensor, an infrared light video image by performing infrared light video image capture according to the first shutter and the first gain; and
outputting, by a master processing chip in the camera, a fused video image by fusing the visible light video image and the infrared light video image, wherein fusing the visible light video image and the infrareds light video image comprises fusing brightness information of the visible light video image and brightness information of the infrared light video image, or fusing detail information of the visible light video image and detail information of the infrared light video image;

transmitting, by the master processing chip in response to receiving a snapshot instruction, the snapshot instruction to a synchronization processor in the camera;

transmitting, by the synchronization processor, the snapshot instruction to the first image sensor and the second image sensor respectively within a preset period of time;

obtaining, by the first image sensor in response to receiving the snapshot instruction, a visible light image by taking a snapshot according to a second shutter and a second gain, wherein the second shutter and the second gain are determined independently of the first shutter and the first gain, wherein the second shutter is smaller than the first shutter, and the second gain is smaller than the first gain;

obtaining, by the second image sensor in response to receiving the snapshot instruction, an infrared light image by taking a snapshot according to the second shutter and the second gain; and receiving, by the synchronization processor, the visible light image from the first image sensor and the infrared light image from the second image sensor in accordance with a preset timing, and transmitting, by the synchronization processor, the visible light image and the infrared light image to the master processing chip;

obtaining a fused snapped image by at least one of:
the master processing chip fusing the visible light image and the infrared light image, or
the master processing chip transmitting the visible light image and the infrared light image to a slave processing chip in the camera, and the slave processing chip fusing the visible light image and the infrared light image and transmitting the fused snapped image to the master processing chip;

performing, by the slave processing chip, vehicle feature recognition on the fused snapped image based on a deep learning algorithm, and transmitting, by the slave processing chip, a recognition result to the master processing chip; and outputting, by the master processing chip, the fused snapped image.

7. The method according to claim 6, further comprising:
interrupting, by the first image sensor in response to receiving the snapshot instruction, the visible light video image capture; and
interrupting, by the second image sensor in response to receiving the snapshot instruction, the infrared light video image capture.

8. The method according to claim 6, further comprising:
transmitting, by the first image sensor, the visible light image to the synchronization processor;
transmitting, by the second image sensor, the infrared light image to the synchronization processor; and
transmitting, by the synchronization processor, the visible light image and the infrared light image to the master processing chip.

9. The method according to claim 8, wherein transmitting the visible light image and the infrared light image to the master processing chip comprises:
splicing, by the synchronization processor, a frame of the visible light image and a frame of infrared light image snapped synchronously into a frame of spliced image; and transmitting, by the synchronization processor, the spliced image to the master processing chip.

10. The method according to claim 6, further comprising:
performing, by the master processing chip, at least one of the following processing on the fused snapped image: ISP or compression.

11. The method according to claim 6, further comprising:
performing, by the slave processing chip, at least one of the following processing on the fused snapped image: ISP or compression.

12. A non-transitory computer readable storage medium storing program instructions for execution by at least one processor to perform operations comprising:
receiving, by a master processing chip in a camera, a visible light video image from a first image sensor in the camera and an infrared light video image from a second image sensor in the camera, wherein the visible light video image is obtained by the first image sensor performing visible light video image capture of visible light output by a light splitter in the camera according to a first shutter and a first gain, wherein the infrared light video image is obtained by the second image sensor performing infrared light video image capture of infrared light output by the light splitter according to the first shutter and the first gain, and wherein the light splitter splits an incident light entering the camera through a lens in the camera into the visible light and the infrared light;

outputting, by the master processing chip in the camera, a fused video image by fusing the visible light video image and the infrared light video image, wherein fusing the visible light video image and the infrareds light video image comprises fusing brightness information of the visible light video image and brightness information of the infrared light video image, or fusing detail information of the visible light video image and detail information of the infrared light video image;

transmitting, by the master processing chip in response to receiving a snapshot instruction, the snapshot instruction to a synchronization processor in the camera;

transmitting, by the synchronization processor, the snapshot instruction to the first image sensor and the second image sensor respectively within a preset period of time;

receiving, by the synchronization processor, a visible light image from the first image sensor and an infrared light image from the second image sensor in accordance with a preset timing, and transmitting, by the synchronization processor, the visible light image and the infrared light image to the master processing chip, wherein the visible light image is obtained by the first image sensor taking a first snapshot according to a second shutter and a second gain in response to receiving the snapshot instruction, wherein the infrared light image is obtained by the second image sensor taking a second snapshot according to the second shutter and the second gain in response to receiving the snapshot instruction, wherein the second shutter and the second gain are determined independently of the first shutter and the first gain, and wherein the second shutter is smaller than the first shutter, and the second gain is smaller than the first gain; and obtaining a fused snapped image by at least one of
the master processing chip fusing the visible light image and the infrared light image, or
the master processing chip transmitting the visible light image and the infrared light image to a slave processing chip in the camera, and the slave processing chip fusing the visible light image and the infrared light image and transmitting the fused snapped image to the master processing chip;

performing, by the slave processing chip, vehicle feature recognition on the fused snapped image based on a deep learning algorithm, and transmitting, by the slave processing chip, a recognition result to the master processing chip; and outputting, by the master processing chip, the fused snapped image.

13. The non-transitory computer readable storage medium according to claim 12,
    wherein the first image sensor is configured to interrupt the visible light video image capture in response to receiving the snapshot instruction, and
    wherein the second image sensor is configured to interrupt the infrared light video image capture in response to receiving the snapshot instruction.

14. The non-transitory computer readable storage medium according to claim 12, wherein transmitting the visible light image and the infrared light image to the master processing chip comprises:
    splicing, by the synchronization processor, a frame of the visible light image and a frame of infrared light image snapped synchronously into a frame of spliced image; and
    transmitting, by the synchronization processor, the spliced image to the master processing chip.

\* \* \* \* \*